(12) United States Patent
Rodgers et al.

(10) Patent No.: US 9,108,374 B2
(45) Date of Patent: Aug. 18, 2015

(54) TIRE CURING BLADDERS

(75) Inventors: Michael Brendan Rodgers, Seabrook, TX (US); Anthony Jay Dias, Houston, TX (US); Robert John Claassen, II, Baytown, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 360 days.

(21) Appl. No.: 13/590,872

(22) Filed: Aug. 21, 2012

(65) Prior Publication Data

US 2013/0087953 A1     Apr. 11, 2013

Related U.S. Application Data

(60) Provisional application No. 61/543,384, filed on Oct. 5, 2011.

(51) Int. Cl.
| | |
|---|---|
| C08L 93/00 | (2006.01) |
| B29D 30/00 | (2006.01) |
| C08L 23/22 | (2006.01) |
| C08L 23/20 | (2006.01) |
| B29D 30/06 | (2006.01) |
| C08K 5/01 | (2006.01) |
| C08L 11/00 | (2006.01) |
| C08L 91/00 | (2006.01) |
| B29C 33/50 | (2006.01) |

(52) U.S. Cl.
CPC ........ *B29D 30/0061* (2013.01); *B29D 30/0654* (2013.01); *C08L 23/20* (2013.01); *C08L 23/22* (2013.01); *B29C 33/505* (2013.01); *B29D 2030/0655* (2013.01); *C08K 5/01* (2013.01); *C08L 11/00* (2013.01); *C08L 91/00* (2013.01); *C08L 93/00* (2013.01)

(58) Field of Classification Search
CPC   B29D 30/0061; B29D 30/0654; C08L 23/22; C08K 5/01; B29C 33/505
See application file for complete search history.

(56) References Cited

U.S. PATENT DOCUMENTS

| | | |
|---|---|---|
| 5,580,513 A | 12/1996 | Patitsas et al. |
| 2004/0092648 A1 | 5/2004 | Jones et al. |
| 2006/0167184 A1 | 7/2006 | Waddell et al. |

FOREIGN PATENT DOCUMENTS

| | | |
|---|---|---|
| WO | 2004/044052 | 5/2004 |
| WO | 2006/079359 | 8/2006 |
| WO | 2007/070063 | 6/2007 |

*Primary Examiner* — Peter D Mulcahy

(57) ABSTRACT

An elastomeric composition for a curing bladder comprises isobutylene based elastomer, curative and a hydrocarbon polymer modifier comprising monomers selected from the group consisting of piperylenes, cyclic pentadienes, aromatics, limonenes, pinenes, amylenes, and combinations thereof, wherein the cyclic pentadienes comprise at least 10 weight percent of the monomers by total weight of the monomers. Also disclosed are a tire curing bladder made from the elastomeric composition, a tire curing press containing the bladder, a method of making the tire curing bladder, an improvement to the process of making the tire curing bladder to improve processability of the mixture and fatigue life and DeMattia cut growth, a method of making a tire using the tire curing bladder, and an improvement to the process of making a tire to extend a pull point of the curing bladder and/or to reduce the curing time for the tire construct.

20 Claims, 3 Drawing Sheets

TIRE CURING BLADDERS

CROSS REFERENCE TO RELATED APPLICATIONS PRIORITY

This application claims priority to Provisional Application No. 61/543,384 filed on Oct. 5, 2011, the disclosures of which are incorporated herein by reference in their entireties.

BACKGROUND (1) Field of the Invention

This invention relates to tire curing bladders, their manufacture and their use.

(2) Description of Related Art including information disclosed under 37 CFR 1.97-1.98

Pneumatic rubber vehicle tires are generally produced by building, molding and curing a green or uncured tire in a molding press. The green tire construct is pressed outwardly against a mold surface by means of an inner fluid-expandable bladder, commonly referred to as a curing bladder. By this method, the green tire is shaped against the outer mold surface which defines the tire tread pattern and configuration of the sidewalls. By application of heat and pressure via the curing bladder, the tire is molded and vulcanized at elevated temperatures.

Briefly, the proper selection of elastomers and compounding materials for the bladder formulation is essential in ensuring durability, required service life, and efficient curing bladder operation in a tire factory. Butyl rubber, e.g., isobutylene-isoprene copolymer, is the elastomer of choice in curing bladder formulations due to excellent heat aging resistance, good flex and tear resistance, and impermeability to air, inert gases, and water vapor. Fundamentally, this is due to the superior heat and steam resistance of cured butyl rubber and this has resulted in its wide use for high heat resistant applications.

Recently, there has been a global shortage of butyl rubber, creating a need to use less butyl rubber in the manufacture of curing bladders. There is also an ongoing need to improve the durability and service life of curing bladders, i.e., to extend the pull point of the curing bladder—bladder failure, when it occurs, can lead to the loss of up to six tires in a typical tire manufacturing process. There is also an ongoing need to improve heat transport through the bladder to improve the efficiency of the curing process and increase production rates on the vulcanization press.

SUMMARY

The present invention provides an elastomeric composition comprising a hydrocarbon polymer modifier ("HPM"), wherein the HPM comprises monomers selected from the group consisting of piperylenes, cyclic pentadienes, aromatics, limonenes, pinenes, amylenes, and combinations thereof, and wherein the cyclic pentadienes comprise at least 10 weight percent of the monomers by total weight of the monomers.

In an embodiment, the elastomeric composition comprises 100 parts by weight of elastomer, a curative and from 1 phr to 50 phr of the HPM, wherein the elastomer comprises at least one isobutylene based elastomer.

In an embodiment, the elastomer comprises at least 70 mole percent of a $C_4$ to $C_7$ isomonoolefin derived unit. In an embodiment, the curative comprises from 1 phr to 12 phr of a halogenated phenolic resin curative, polychloroprene, or a combination thereof. In an embodiment, the curative further comprises zinc oxide and stearic acid. In an embodiment, the elastomeric composition further comprises carbon black. In an embodiment, the elastomeric composition is vulcanized.

In an embodiment, the cyclic pentadienes comprise at least 50 weight percent of the monomers by total weight of the monomers. In an embodiment, the HPM has a Ring & Ball softening point of from 100° C. to 140° C. In an embodiment, the HPM is at least partially hydrogenated. In an embodiment, the HPM comprises less than 1 percent olefinic protons based on the total protons in the HPM. In an embodiment, the HPM comprises less than 10 percent aromatic protons based on the total protons in the HPM.

In an embodiment, the elastomeric composition comprises an average aged (3 days at 100° C., 7 days at 100° C. and 3 days at 125° C.) tensile strength retention less than about 130 percent, an average aged (3 days at 100° C., 7 days at 100° C. and 3 days at 125° C.) tear strength retention less than about 110 percent, an air permeation coefficient less than about 150 $cc*mm/(m^2 \cdot day)$, a fatigue life of at least 700 kilocycles, and a DeMattia cut growth less than about 10 mm.

In one embodiment, a curing bladder comprises the elastomeric composition described above. In another embodiment, the curing bladder is disposed in a tire curing press to facilitate shaping and curing a rubber tire, i.e., the embodiment provides a tire curing press comprising the curing bladder disposed therein.

In another embodiment, a method of making a tire curing bladder comprises: mixing the elastomer, curative and HPM, and molding and curing the mixture into the shape of a tire curing bladder.

In another embodiment, in a process of making a tire curing bladder comprising mixing 100 parts by weight of elastomer, a curative and from 1 phr to 50 phr of a plasticizer, wherein the elastomer comprises at least one isobutylene based elastomer, and molding and curing the mixture into the shape of a tire curing bladder, a method to improve processability of the mixture and fatigue life and DeMattia cut growth of the cured mixture comprises incorporating the HPM into the mixture as at least a portion of the plasticizer.

In another embodiment, a method of using a tire curing press to make a tire comprises installing the tire curing bladder described above into the tire curing press, loading an uncured hydrocarbon rubber composition into a mold of the tire curing press between the curing bladder and a mold surface, closing the mold and expanding the curing bladder therein to press the uncured hydrocarbon rubber composition against the mold surface, curing the hydrocarbon rubber composition under conditions of heat and pressure, deflating the curing bladder, and removing the cured hydrocarbon rubber composition from the mold.

In another embodiment, in a process using a tire curing press to make a tire, comprising installing a tire curing bladder into the tire curing press and repetitively loading an uncured hydrocarbon rubber composition into a mold of the tire curing press between the curing bladder and a mold surface, closing the mold and expanding the curing bladder therein to press the uncured hydrocarbon rubber composition against the mold surface, curing the hydrocarbon rubber composition for a period of time under conditions of heat and pressure, deflating the curing bladder and removing the cured hydrocarbon rubber composition from the mold, the invention provides a method to extend a pull point of the curing bladder, to reduce the curing time for the hydrocarbon rubber composition, or both, which comprises installing a tire curing bladder described above into the press.

DETAILED DESCRIPTION

Figure 1:
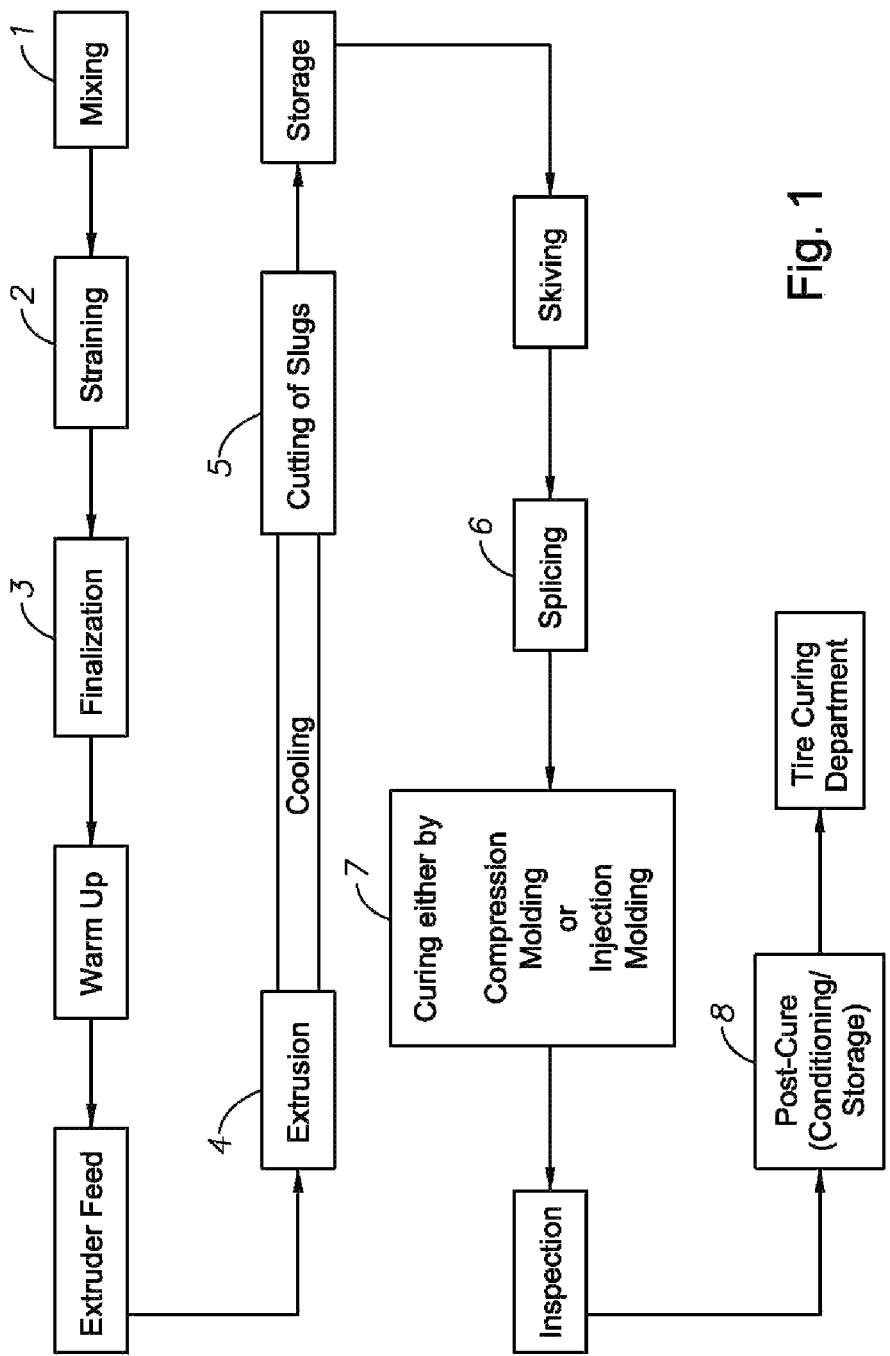
FIG. 1 shows a simplified schematic of a process for producing a curing bladder according to an embodiment wherein the HPM may be added in either the mixing step, finalization or another stage, e.g., first, second, or third mixing stages.

Various specific embodiments, versions, and examples are described herein, including exemplary embodiments and definitions that are adopted for purposes of understanding the claimed invention. While the following detailed description gives specific embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

A "curing bladder" is a flexible, inflatable bladder used or capable of being inflated to mold and/or cure elastomeric articles such as tires in a tire press.

The term "phr" means parts per hundred parts of rubber by weight, and is a measure common in the art wherein components of a composition are measured relative to the total of all of the elastomer (rubber) components. The total phr or parts for all rubber components, whether one, two, three, or more different rubber components are present in a given recipe is always defined as 100 phr. Other non-rubber components are generally proportional to the 100 parts of rubber and the relative amounts may be expressed in phr.

All hydrocarbon polymer modifier (HPM) component percentages listed herein are weight percentages, unless otherwise noted. "Substantially free" of a particular component in reference to a composition is defined to mean that the particular component comprises less than 0.5 weight percent in the composition, or more preferably less than 0.25 weight percent of the component in the composition, or most preferably less than 0.1 weight percent of the component in the composition.

The term "elastomer" as used herein refers to any polymer or combination of polymers consistent with the ASTM D1566 definition, incorporated herein by reference. As used herein, the term "elastomer" may be used interchangeably with the term "rubber."

As used herein, "immiscibility" is present when experimental techniques to observe the glass transition temperature (Tg) show distinct separate and independent peaks for the elastomer and the interpolymer. Miscible systems on the other hand generally result in a single Tg peak which is shifted from the Tg peak for the elastomer alone, or which has a shoulder, due to the presence of the miscible interpolymer in the elastomer phase. Tg can be determined by differential scanning calorimetry ("DSC").

The average aged tensile strength retention is the average based on equally weighted individual specimens aged 3 days at 100° C., 7 days at 100° C. and 3 days at 125° C., relative to the tensile strength of otherwise identical specimens which have not been aged at elevated temperatures. Tensile properties are determined herein according to ASTM D638. Tear strength is determined herein according to ASTM D412 Die C. DeMattia cut growth is determined herein according to ASTM D813-95.

Elastomer

The elastomeric composition employed in the curing bladder comprises at least one butyl rubber. In one embodiment, a single one or a mixture of two or more of the various elastomers are generally present in the elastomeric composition at 100 phr with HPM being present at from 1 phr to 50 phr.

Preferred elastomers useful in the practice of this invention include isobutylene-based homopolymers or copolymers. An isobutylene based elastomer or a polymer refers to an elastomer or a polymer comprising at least 70 mol % repeat units from $C_4$ to $C_7$ isomonoolefins such as isobutylene. An isomonoolefin refers to a hydrocarbon having one double bond wherein one of the carbon atoms in the olefin group is unsubstituted and the other carbon atom is disubstituted with alkyl groups. These polymers can be described as random copolymer of a $C_4$ to $C_7$ isomonoolefin derived unit, such as an isobutylene derived unit, and at least one other polymerizable unit. The isobutylene-based copolymer may or may not be halogenated.

In one embodiment, the elastomer is a butyl-type rubber or branched butyl-type rubber, including halogenated versions of these elastomers. Useful elastomers are unsaturated butyl rubbers such as homopolymers and copolymers of olefins or isoolefins and multiolefins, or homopolymers of multiolefins. These and other types of elastomers suitable for the invention are well known and are described in Rubber Technology, pp. 209-581 (Morton ed., Chapman & Hall 1995), The Vanderbilt Rubber Handbook, pp. 105-122 (Ohm ed., R. T. Vanderbilt Co., Inc. 1990), and Kresge and Wang in Kirk-Othmer Encyclopedia Of Chemical Technology, pp. 934-955 (John Wiley & Sons, Inc. 4th ed., 1993). Non-limiting examples of unsaturated elastomers useful in the method and composition of the present invention are poly(isobutylene-co-isoprene), polyisoprene, polybutadiene, polyisobutylene, poly(styrene-co-butadiene), natural rubber, star-branched butyl rubber, and mixtures thereof. Useful elastomers in the present invention can be made by any suitable means known in the art, and the invention is not herein limited by the method of producing the elastomer.

Elastomeric compositions may comprise at least one butyl rubber. Butyl rubbers are prepared by reacting a mixture of monomers, the mixture having at least (1) a $C_4$ to $C_7$ isoolefin monomer component such as isobutylene with (2) a multiolefin monomer component. The isoolefin is in a range from 70 wt % to 99.5 wt % by weight of the total monomer mixture in one embodiment, and 85 wt % to 99.5 wt % in another embodiment. The multiolefin component is present in the monomer mixture from 30 wt % to 0.5 wt % in one embodiment, and from 15 wt % to 0.5 wt % in another embodiment. In yet another embodiment, from 8 wt % to 0.5 wt % of the monomer mixture is multiolefin.

The isoolefin is a $C_4$ to $C_7$ compound, non-limiting examples of which are compounds such as isobutylene and isobutene. The multiolefin is a $C_4$ to $C_{14}$ multiolefin such as isoprene, butadiene, 2,3-dimethyl-1,3-butadiene, myrcene, 6,6-dimethylfulvene, hexadiene, cyclopentadiene, and piperylene, and other monomers such as disclosed in EP 0 279 456, U.S. Pat. No. 5,506,316 and U.S. Pat. No. 5,162,425. Other polymerizable monomers such as styrene and dichlorostyrene are also suitable for homopolymerization or copolymerization in butyl rubbers. One embodiment of the butyl rubber polymer of the invention is obtained by reacting 92 wt % to 99.5 wt % of isobutylene with 0.5 wt % to 8 wt % isoprene, or from 0.5 wt % to 5.0 wt % isoprene in yet another embodiment. Butyl rubbers and methods of their production are described in detail in, for example, U.S. Pat. No. 2,356,128; U.S. Pat. No. 3,968,076; U.S. Pat. No. 4,474,924; U.S. Pat. No. 4,068,051; and U.S. Pat. No. 5,532,312. See also WO 2004/058828; WO 2004/058827; WO 2004/058835; WO 2004/058836; WO 2004/058825; WO 2004/067577; and WO 2004/058829.

The elastomer compositions according to the present invention are preferably at least one butyl rubber. Butyl rubbers are isobutylene-based elastomers and include butyl rubber, bromobutyl rubber, chlorobutyl rubber and branched ("star-branched") halogenated butyl rubbers. Butyl rubbers are per se known in formulations for many different tire applications, including inner tubes or innerliners for tires, and are the polymers of choice for air-retention in tire inner tubes and innerliners for passenger, truck/bus, and aircraft applications. See, for example, EPO 127 998.

In a preferred embodiment, the butyl rubber of the invention is selected from the group consisting of butyl rubber, bromobutyl rubber, chlorobutyl rubber and branched ("star branched") halogenated butyl rubbers, and halogenated random copolymers of isobutylene and para-methylstyrene, such as EXXPRO™ elastomers (ExxonMobil Chemical Company, Houston, Tex.). The latter type of butyl rubber is a halogenated random copolymer of isobutylene and para-methylstyrene, and has been of particular interest due to its improvements over conventional butyl rubbers. A blend of EXXPRO™ elastomers with secondary elastomers or other polymers affords a compound having a desirable balance of properties achieved through suitable processing windows. See, e.g., U.S. Pat. No. 5,386,864.

A commercial example of a desirable butyl rubber is EXXON™ Butyl 268 grade of poly(isobutylene-co-isoprene), having a Mooney viscosity of from 46 to 56 (ML1+8 at 125° C., ASTM D1646, modified) (ExxonMobil Chemical Company, Houston, Tex.).

A commercial embodiment of a suitable halogenated butyl rubber of the present invention is EXXON™ Bromobutyl 2222 (ExxonMobil Chemical Company, Houston, Tex.). Its Mooney viscosity is from 27 to 37 (ML1+8 at 125° C., ASTM D1646, modified), and the bromine content is from 1.8 wt % to 2.2 wt %. Further, cure characteristics of EXXON™ Bromobutyl 2222 are as follows: MH is from 28 to 40 dN-m, ML is from 7 to 18 dN-m (ASTM D2084).

A commercial embodiment of a suitable halogenated butyl rubber of the present invention is EXXON™ Chlorobutyl 1066 (ExxonMobil Chemical Company, Houston, Tex.). Its Mooney viscosity is from 33 to 43 (ML1+8 at 125° C., ASTM D1646, modified), and the chlorine content is from 1.18 wt % to 1.34 wt %. Further, cure characteristics of EXXON™ Chlorobutyl 1066 are as follows: MH is from 34 to 48 dN-m, ML is from 9.5 to 18.5 dN-m (ASTM D2084).

A commercial embodiment of the halogenated star branched butyl rubber of the present invention is EXXON™ Bromobutyl 6222 (ExxonMobil Chemical Company, Houston, Tex.), having a Mooney viscosity (ML1+8 at 125° C., ASTM D1646, modified) of from 27 to 37, and a bromine content of from 2.2 wt % to 2.6 wt %. Further, cure characteristics of EXXON™ Bromobutyl 6222 are as follows: MH is from 24 to 38 dN-m, ML is from 6 to 16 dN-m (ASTM D2084).

A commercial embodiment of the halogenated isobutylene-p-methylstyrene rubber of the present invention is EXXPRO™ elastomer (ExxonMobil Chemical Company, Houston, Tex.), having a Mooney viscosity (ML 1+8 at 125° C., ASTM D1646, modified) of from 30 to 50, a p-methylstyrene content of from 4 wt % to 8.5 wt %, and a bromine content of from 0.7 wt % to 2.2 wt %.

Typical elastomers that may be included in the elastomeric compositions include butyl rubber, branched ("star-branched") butyl rubber, star-branched polyisobutylene rubber, random copolymers of isobutylene and para-methylstyrene (poly(isobutylene-co-p-methylstyrene)), polybutadiene rubber ("BR"), high cis-polybutadiene, polyisoprene rubber, isoprene-butadiene rubber ("IBR"), styrene-isoprene-butadiene rubber ("SIBR"), styrene-butadiene rubber ("SBR"), solution-styrene-butadiene rubber ("sSBR"), emulsion-styrene-butadiene rubber, nitrile rubber, ethylene propylene rubber ("EP"), ethylene-propylene-diene rubber ("EPDM"), synthetic-polyisoprene, general purpose rubber, natural rubber, and any halogenated versions of these elastomers and mixtures thereof. Useful elastomers can be made by any suitable means known in the art, and the invention is not herein limited by the method of producing the elastomer.

The elastomer may or may not be halogenated. Preferred halogenated elastomers may be selected from the group consisting of halogenated butyl rubber, bromobutyl rubber, chlorobutyl rubber, halogenated branched ("star-branched") butyl rubbers, and halogenated random copolymers of isobutylene and para-methylstyrene.

In some embodiments, the elastomeric composition comprises a blend of two or more elastomers. Blends of elastomers may be reactor blends and/or melt mixes. The individual elastomer components may be present in various conventional amounts, with the total elastomer content in the elastomeric composition being expressed as 100 phr in the formulation.

In an embodiment, the elastomer may be at least one non isobutylene based rubber of types conventionally used in tire rubber compounding, and herein referred to as "general purpose rubber." A general purpose rubber may be any rubber that usually provides high strength and good abrasion along with low hysteresis and high resilience. These elastomers may require antidegradants in the mixed compound if they have poor resistance to both heat and ozone.

Examples of general purpose rubbers include natural rubbers ("NR"), polyisoprene rubber ("IR"), poly(styrene-co-butadiene) rubber ("SBR"), polybutadiene rubber ("BR"), poly(isoprene-co-butadiene) rubber ("IBR"), styrene-isoprene-butadiene rubber ("SIBR"), and mixtures thereof.

The elastomeric composition may also comprise rubbers of ethylene and propylene derived units such as ethylene-propylene rubber ("EP") and ethylene-propylene-diene rubber ("EPDM"), and their mixtures. EP and EPDM are considered to be general purpose elastomers. Examples of suitable termonomers in making EPDM are ethylidene norbornene, 1,4-hexadiene, dicyclopentadiene, as well as others.

In one embodiment, the elastomer may include a polybutadiene (BR) rubber. The Mooney viscosity of the polybutadiene rubber as measured at 100° C. (ML 1+4, ASTM D1646) may range from 35 to 70, or from 40 to about 65, or, in another embodiment, from 45 to 60.

Another useful synthetic rubber is high cis-polybutadiene ("cis-BR"). By "cis-polybutadiene" or "high cis-polybutadiene", it is meant that 1,4-cis polybutadiene is used, wherein the amount of the cis component is at least 95%.

The elastomeric composition may also comprise a polyisoprene (IR) rubber. The Mooney viscosity of the polyisoprene rubber as measured at 100° C. (ML 1+4, ASTM D1646) may range from 35 to 70, or from 40 to about 65, or in another embodiment from 45 to 60.

In another embodiment, the elastomer may also comprise a natural rubber. Natural rubbers are described in detail by Subramaniam in RUBBER TECHNOLOGY, pp. 179-208 (Morton, ed., Chapman & Hall, 1995). Desirable embodiments of the natural rubbers may be selected from technically specified rubbers ("TSR"), such as Malaysian rubbers which include, but are not limited to, SMR CV, SMR 5, SMR 10, SMR 20, SMR 50, and mixtures thereof. Preferred natural rubbers have a Mooney viscosity at 100° C. (ML 1+4, ASTM D1646) of from 30 to 120, or more preferably from 40 to 80.

In another embodiment, the elastomer may comprise a styrene rubber such as styrene butadiene rubber ("SBR") such as emulsion-SBR ("E-SBR"), solution SBR (S-SBR), high styrene rubber ("HSR") and the like. Desirable embodiments of the SBRs may have a styrene content from 10 wt % to 60 wt %, such as E-SBR elastomers available from JSR Corporation, which include JSR 1500 (25 wt % styrene), JSR 1502 (25 wt % styrene), JSR 1503 (25 wt % styrene), JSR 1507 (25 wt % styrene), JSR 0202 (45 wt % styrene), JSR SL552 (25 wt % styrene), JSR SL574 (15 wt % styrene), JSR SL563 (20 wt % styrene), JSR 0051, JSR 0061, or the like. Preferred SBRs have a Mooney viscosity at 100° C. (ML 1+4, ASTM D1646) of from 30 to 120, or more preferably from 40 to 80.

Other useful elastomers, including functionalized elastomers, are described in U.S. Pat. No. 7,294,644, which is hereby incorporated herein by reference in its entirety for all jurisdictions where permitted. The elastomers can be blended with various other rubbers or plastics, in particular thermoplastic resins such as nylons or polyolefins such as polypropylene or copolymers of polypropylene. These compositions are useful in air barriers such as bladders, tire inner tubes, tire innerliners, air sleeves (such as in air shocks), diaphragms, as well as other applications where high air or oxygen retention is desirable.

Hydrocarbon Polymer Modifiers (HPMs)

The elastomeric composition employed in the curing bladder further comprises a hydrocarbon polymer modifier (HPM) which is a polymer or an oligomer of one or more monomers. Hydrocarbon polymer modifiers include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes, modified terpenes, and hydrogenated rosin esters. In some embodiments the HPM is hydrogenated. In other embodiments the HPM is non-polar. As used herein, non-polar means that the HPM is substantially free of monomers having polar groups.

As used herein, reference to monomers in the HPM oligomer is understood to refer to the as-oligomerized and/or as-derivatized units derived from that monomer. An oligomer is a molecule that comprises a plurality of monomer units, e.g., dimers, trimers, tetramers, and so on up to tens or hundreds or more. The terms polymer and interpolymer in reference to HPMs are used broadly herein and in the claims to encompass higher oligomers having a number average molecular weight (Mn) equal to or greater than 100 such as from 400 to 1000, as well as compounds that meet the molecular weight requirements for polymers according to classic ASTM definitions.

Hydrocarbon polymer modifiers can be used as elastomer compounding materials. Depending on how the HPM is compounded, optimization of rubber characteristics for curing bladder molding, curing, performance and durability can be achieved. The chemical composition (monomer content and hydrogenation) and macrostructure (molecular weight, molecular weight distribution, and branching) of the HPM provide unique properties to the polymer additive.

In accordance with the present invention, the HPM used in rubber compounding includes olefins such as one or more of piperylene, isoprene, amylenes, and cyclic components. The HPM may also contain aromatic olefins such as styrenic components and indenic components. Differences in the HPMs are largely due to the olefins in the feedstock from which the hydrocarbon components are derived.

In one embodiment, the HPM comprises a cyclic component. Cyclic components are generally a distillate cut or synthetic mixture of $C_5$ and $C_6$ cyclic olefins, diolefins, and dimers, codimers and trimers, etc., from a distillate cut. Cyclics include, but are not limited to, cyclopentene, cyclopentadiene, dicyclopentadiene, cyclohexene, 1,3-cyclohexadiene, 1,4-cyclohexadiene, and the like. Preferred cyclics are cyclopentadiene and dicyclopentadiene, which may be in either the endo or exo form. The cyclics may or may not be substituted. As used herein, "cyclic pentadienes" refer to cyclic hydrocarbons having at least one cyclopentadiene moiety, which may be in either the endo or exo form and may be substituted or unsubstituted. Preferred substituted cyclics include cyclopentadienes and dicyclopentadienes substituted with a $C_1$ to $C_{40}$ linear, branched, or cyclic alkyl group, preferably one or more methyl groups. In one embodiment, the cyclic components are selected from the group consisting of: cyclopentadiene, cyclopentadiene dimer, cyclopentadiene trimer, cyclopentadiene-$C_5$ codimer, cyclopentadiene-piperylene codimer, cyclopentadiene-$C_4$ codimer, cyclopentadiene-methyl cyclopentadiene codimer, methyl cyclopentadiene, methyl cyclopentadiene dimer, and mixtures thereof. In one embodiment, the HPM comprises an oligomer comprising from 5% cyclic pentadienes up to 95% cyclic pentadienes, by weight of the monomers used to make the oligomer, preferably at least 10% cyclic pentadienes, more preferably at least 20% cyclic pentadienes, more preferably at least 30% cyclic pentadienes, more preferably at least 40% cyclic pentadienes, more preferably at least 50% cyclic pentadienes, more preferably at least 60% cyclic pentadienes, more preferably at least 70% cyclic pentadienes, more preferably at least 75% cyclic pentadienes, by weight of the monomers in the monomer mixture from which the HPM is prepared.

In general, the cyclic components in the HPM increase the softening point of the HPM, are compatible with the butyl rubber and improve aging characteristics, including tensile strength, tear strength and fatigue life, as well as gas permeability. In one embodiment, the HPM comprises an oligomer comprising from 5% cyclics up to 95% cyclics, by weight of the monomers used to make the oligomer, preferably at least 10% cyclics, more preferably at least 20% cyclics, more preferably at least 30% cyclics, more preferably at least 40% cyclics, more preferably at least 50% cyclics, more preferably at least 60% cyclics, more preferably at least 70% cyclics, more preferably at least 75% cyclics, by weight of the monomers in the monomer mixture from which the HPM is prepared.

In one embodiment, the HPM may be prepared from a monomer mix that can include up to 60% cyclics or up to 50% cyclics, by weight of the monomers in the mix. Typical lower limits include at least about 0.1% or at least about 0.5% or from about 1.0% cyclics in the monomer mix. In at least one embodiment, the HPM monomer mix may include more than 10% cyclic components up to 20% cyclics or more, or preferably up to 30% cyclics or more, or more preferably up to 40% cyclics or more, or more preferably up to 45% or 50% cyclics or more, by weight of the monomers in the monomer mixture from which the HPM is prepared. In a particularly preferred embodiment, the HPM monomer mixture comprises from about 10% to about 50% cyclics, or from about 20% to about 45% cyclics, or from about 20% to about 40% cyclic components.

In one embodiment, the HPM may be prepared from a monomer mix that can include at least 50% cyclics up to 95% cyclics or up to 99% cyclics, by weight of the monomers in the mix. In one embodiment, the HPM monomer mix may include at least 50% cyclic components, or preferably at least 60% cyclics or more, or more preferably at least 70% cyclics, or more preferably at least 75% or 80% cyclics, by weight of the monomers in the monomer mixture from which the HPM is prepared. In a particularly preferred embodiment, the HPM monomer mixture comprises from about 50% to about 95% cyclics, or from about 60% to about 90% cyclics, or from about 70% to about 80% cyclic components.

Suitable HPMs may also include both aromatic and non-aromatic non-cyclic components. The HPM may also contain, in addition to the alicyclic components, non-cyclic "aliphatic" hydrocarbon components, which have a hydrocarbon chain formed from $C_4$-$C_6$ fractions containing variable quantities of piperylene, isoprene, mono-olefins, and non-polymerizable paraffinic compounds. Such HPMs are based on pentene, butane, isoprene, piperylene, and contain reduced quantities of cyclopentadiene or dicyclopentadiene.

Piperylene components are generally a distillate cut or synthetic mixture of $C_5$ diolefins, which include linear, 5-carbon diolefins, such as cis-1,3-pentadiene, trans-1,3-pentadiene, and mixed 1,3-pentadiene. For example, the piperylene component in one embodiment can include trans-pentadiene-1,3, cyclopentene, cis-pentadiene and mixtures thereof. In general, piperylene components do not include branched $C_5$ diolefins such as isoprene. In one embodiment, the HPM is prepared from a monomer mix having from 0.1% to 90% piperylene components, or with a range of piperylene components from any lower limit selected from 0.1, 1, 10, 20, 25, 30, 35, 40, 45, or 50% piperylene components up to any higher upper limit selected from 80, 75, 70, 65, 60, 55, 50, 45, 40 or 35% piperylene components, by weight of the total monomers in the monomer mixture. In one embodiment, the HPM is prepared from a monomer mix comprising from 40% to 80% piperylene components, or from 40 to 65% piperylene components, or from 40% to 50% piperylene components.

In embodiments, the HPM comprises terpenes such as isoprene, pinenes, limonenes, and so on, or any combination of these. Terpenes may be linear, branched or cyclic and generally include isoprene oligomers, such as, for example, monoterpenes, sesquiterpenes, diterpenes, sesterterpenes, triterpenes, tetraterpenes, and so on. Limonenes include substituted and unsubstituted limonene, which is a cyclic monoterpene. Pinenes include substituted and unsubstituted α- and β-pinene, which are bicyclic monoterpenoids.

In one embodiment, the HPM is substantially free of isoprene. In another embodiment, the HPM is prepared from a monomer mix that contains up to 15% isoprene, or less than 10% isoprene, by weight of the monomers in the mix. In yet another embodiment, the monomer mix contains less than 5% isoprene by weight of the monomers in the mix.

"Amylene," "amylenes" or "amylene component" herein refer to 5-carbon branched or linear (non-cyclic) monoolefins. In general, the amylene component acts as a chain transfer agent to inhibit molecular weight growth. In an embodiment, the amylene component is selected from the group consisting of 2-methylbutene-1,2-methylbutene-2, pentene-1, cis-pentene-2, trans-pentene-2 and mixtures thereof. In one embodiment, the HPM is substantially free of amylene derived units. In another embodiment, the HPM monomer mix contains up to 40% amylene, or less than 30% amylene, or less than 25% amylene, or less than 20% amylene or less than 15% amylene or less than 10% amylene or less than 5% amylene, by weight of the monomers in the monomer mix. In yet another embodiment, the HPM is prepared from a monomer mix of from 0.1% up to 10% amylene, by weight of the monomers in the mixture.

The HPM may also contain "aromatic" hydrocarbon structures having polymeric chains which are formed of aromatic units, such as styrene, xylene, α-methylstyrene, vinyl toluene, and indene. Preferred aromatics that may be in the HPM include one or more of styrene, indene, derivatives of styrene, and derivatives of indene. Particularly preferred aromatic olefins include styrene, alpha-methylstyrene, beta-methylstyrene, indene, and methyl indenes, and vinyl toluenes. In one embodiment, the styrenic components do not include fused-rings, such as indenics. Styrenic components include styrene, derivatives of styrene, and substituted sytrenes. In one embodiment, the aromatic component is a styrenic component that is selected from the group consisting of styrene, ortho-methyl-styrene, meta-methyl-styrene, para-methyl-styrene, α-methyl-styrene, t-beta-methyl-styrene, indene, methyl indene, vinyl toluene, and mixtures thereof. The aromatic or styrenic olefins in an embodiment are present in the HPM up to 60% styrenic components or up to 50%, typically from 5% to 45%, or more preferably from 5% to 30%. In particularly preferred embodiments, the HPM comprises from 10% to 25% aromatic or especially styrenic olefins.

In one embodiment, the HPM may contain an aromatic content to match the aromatic content of the elastomer component(s) in the curing bladder, e.g., a high aromatic content in styrene rubbers, or a low aromatic content in natural rubbers, for compatibility or miscibility. Compatibility is desired, for example, where the HPM is used to change or shift the Tg of the elastomer domain, where improved dispersion of the HPM is desired, and/or where compatibility facilitates inhibition of HPM migration in the elastomeric composition.

In one embodiment, the HPM is non-aromatic. In another embodiment, the hydrocarbon modifier comprise no more than 5 percent aromatic hydrogen, preferably no more than 1 percent aromatic hydrogen, based on the total moles of hydrogen in the oligomer as determined by proton nuclear magnetic resonance (H-NMR).

In one embodiment, the HPM can have a weight ratio of units derived from aromatic components to units derived from cyclic components, or preferably of styrenic components to cyclic components, of from 1:2 to 3:1, preferably from 1:2 to 2.5:1, or more preferably from 0.8:1 to 2.2:1, or from about 1:1 to about 2:1.

In another embodiment, the HPM can comprise from at least 1 mole percent aromatic hydrogen, based on the total moles of hydrogen in the interpolymer as determined by proton nuclear magnetic resonance (H-NMR). In another embodiment the HPM comprises at least 5 mole percent aromatic hydrogen, e.g., from 5 to 30 mole percent aromatic hydrogen, or preferably from 5 to 25 mole percent aromatic hydrogen, or more preferably from 5 to 20 mole percent aromatic hydrogen, or more preferably from 8 to 15 mole percent aromatic hydrogen. In another embodiment, the HPM comprises from 1 to 20 mole percent aromatic hydrogen, or preferably from 2 to 15 mole percent aromatic hydrogen, or more preferably from 2 to 10 mole percent aromatic hydrogen.

The HPM may comprise less than 15% indenic components, or less than 10% indenic components. Indenic components include indene and derivatives of indene. In one embodiment, the HPM comprises less than 5% indenic components. In another embodiment, the HPM is substantially free of indenic components.

The HPM in embodiments is preferably made from a monomer mixture comprising from 1% to 60% piperylene components, from 20% to 98% cyclic components, and from 1% to 60% aromatic, preferably styrenic components. Alternatively or additionally, in an embodiment, the HPM comprises an oligomer of from 10 wt % to 80 wt % units derived from at least one piperylene component, from 15 wt % to 80 wt % units derived from at least one cyclic pentadiene component, and from 10 wt % to 30 wt % units derived from at least one styrenic component. The monomer mixture or the oligomer may optionally comprise up to 5% isoprene, up to 10% amylene components, up to 5% indenic components, or any combination thereof.

In one embodiment there is only one interpolymer in the HPM. In another embodiment, two or more oligomers may be blended. When two or more oligomers are used, either at least one of the interpolymers, or the resulting blended HPM, preferably both, may preferably comprise from 10 wt % to 80 wt % units derived from at least one piperylene component, from 15 wt % to 80 wt % units derived from at least one cyclic pentadiene component, and when present from 10 wt % to 30 wt % units derived from at least one aromatic, preferably styrenic components. The HPM blend may optionally comprise up to 5% isoprene, up to 10% amylene, and up to 5% indenic components. Preferably, the elastomeric composition comprises from 5 phr to 50 phr of HPM or HPM blend.

In another embodiment, the HPM is an interpolymer of (i) a piperylene component; (ii) an aromatic component; and (iii) a cyclic pentadiene component. The cyclic pentadiene component in this embodiment comprises a dicyclopentadiene fraction (DCPD fraction) and a dimethylcyclopentadiene fraction (MCPD fraction), wherein the DCPD fraction consists of any cyclopentadiene dimers and/or cyclopentadiene codimers other than CPD-MCPD, and wherein the MCPD fraction consists of any methylcyclopentadiene dimers and/or methylcyclopentadiene codimers, including any CPD-MCPD codimers. Methylcyclopentadiene codimers include codimers of methylcyclopentadiene with cyclopentadiene, piperylene, butadiene, and so on. Cyclopentadiene codimers include codimers of cyclopentadiene with piperylene, butadiene, and so on. In an embodiment, the DCPD fraction comprises at least 50 wt % of dicyclopentadiene and less than 50 wt % CPD codimers. A weight ratio of the MCPD fraction to the DCPD fraction is preferably from 0.8 to 20, more preferably 1 to 10, and the MCPD fraction is at least 20 wt % of the cyclic pentadiene component. When the proportion of the MCPD fraction exceeds about 0.8 or 1.0 times the proportion of the DCPD fraction in the cyclic component, the interpolymer can unexpectedly have a balance of softening point, molecular weights, molecular weight distribution and aromaticity, for example, a softening point from 40° C. to 160° C., Mn greater than 400, Mw/Mn from 1.5 to 4, Mz less than 15,000, and at least 8 mole percent aromatic hydrogen, based on the total moles of hydrogen in the interpolymer, or preferably, a softening point of at least 80° C., Mn greater than 800, Mw/Mn less than 3, Mz less than 12,000 and/or at least 10 mole percent aromatic hydrogen. Mn is herein defined as the number-average molecular weight, Mw is herein defined as the weight-average molecular weight, and Mz is herein defined as the z-average molecular weight.

The HPM in embodiments is preferably made from a monomer mixture comprising from 15% to 70% piperylene components, from 5% to 70% cyclic components, and from 10% to 30% aromatic, preferably styrenic components. Alternatively or additionally, in an embodiment, the HPM comprises an interpolymer of from 30% to 60% units derived from at least one piperylene component, from 10% to 50% units derived from at least one cyclic pentadiene component, and from 10% to 25% units derived from at least one styrenic component. The monomer mixture or the interpolymer may optionally comprise up to 5% isoprene, up to 10% amylene components, up to 5% indenic components, or any combination thereof.

Generally HPMs in one embodiment have a number average molecular weight (Mn) greater than about 200 g/mole, or greater than about 400 g/mole, or greater than about 500 g/mole, or greater than about 1000 g/mole. In an embodiment the HPM has an Mn between about 900 g/mole and 3000 g/mole, or between about 1000 g/mole and 1500 g/mole. In at least one embodiment, HPMs have a weight average molecular weight (Mw) greater than about 2500 g/mole, or greater than about 5000 g/mole, or from about 2500 g/mole to about 25,000 g/mole, or from 3000 g/mole to 20,000 g/mole. In another embodiment, HPMs have a weight average molecular weight of from 3500 g/mole to 15,000 g/mole, or more preferably from about 5000 g/mole to about 10,000 g/mole. The HPM may have a z-average molecular weight (Mz) greater than about 10,000 g/mole, or greater than about 20,000 g/mole, or greater than about 30,000 g/mole. In embodiments, Mz ranges from 10,000 g/mole to 150,000 g/mole, or from 20,000 g/mole to 100,000 g/mole, or from 25,000 g/mole to 75,000 g/mole, or from 30,000 g/mole to 60,000 g/mole. Mw, Mn, and Mz may be determined by gel permeation chromatography (GPC).

In one embodiment, the HPM has a polydispersion index ("PDI", PDI=Mw/Mn) of 4 or less. In a particularly preferred embodiment, the HPM has a PDI of at least about 2.5, or at least about 3, or at least about 4, or at least about 5. In embodiments, Mz/Mn is greater than 5, greater than 10, greater than 12, greater than 15, greater than 20, greater than 25, or greater than 30. In embodiments, Mz/Mn ranges up to 150 or more, up to 100, up to 80, or up to 60. In other embodiments, Mz/Mn is from 5 to 100, or from 10 to 80, or from 10 to 60, or from 10 to 40, or from 10 to 30, or from 15 to 40, or from 30 to 60 or from 35 to 60.

In an embodiment, the HPM can have a softening point of 80° C. to 160° C., or preferably 100° C. to 160° C., or more preferably from 110° C. to 150° C. Softening point can be determined according to the Ring & Ball Method, as measured by ASTM E-28.

In an embodiment, the HPM can have a glass transition temperature (Tg) of from about 30° C. to about 110° C., or from about 50° C. to 110° C., or from about 60° C. to 100° C. Differential scanning calorimetry (DSC) may be used to determine the Tg of the HPM.

The resins described above may be produced by methods generally known in the art for the production of HPMs, and the invention is not limited by the method of forming the HPM. Preferably, the HPM is produced by combining the olefin feed stream in a polymerization reactor with a Friedel-Crafts or Lewis Acid catalyst at a temperature between 0° C. and 200° C. Friedel-Crafts polymerization is generally accomplished by use of known catalysts in a polymerization solvent, and the solvent and catalyst may be removed by washing and distillation. The polymerization process utilized for this invention may be batchwise or continuous mode. Continuous polymerization may be accomplished in a single stage or in multiple stages.

In one embodiment, the HPM is not hydrogenated (to retain the olefin unsaturation, especially terminal vinyl groups). In another embodiment the HPM may be at least partially hydrogenated (especially to remove terminal vinyl groups, where desired). The hydrogenation of the HPM may be carried out by any method known in the art, and the invention is not limited by the method of hydrogenation. For example, the hydrogenation of the HPM may be either a batchwise or a continuous process, e.g., catalytically hydrogenated. Catalysts employed for the hydrogenation of HPMs are typically supported monometallic and bimetallic catalyst systems based on elements from Group 6, 8, 9, 10, or 11 of the Periodic Table of Elements.

In one embodiment, the HPM is at least partially hydrogenated or may be substantially hydrogenated. As used herein at least partially hydrogenated means that the material contains less than 90% olefinic protons, more preferably less than 75% olefinic protons, more preferably less than 50% olefinic protons, more preferably less than 40% olefinic protons, more preferably less than 25% olefinic protons, more preferably less than 15% olefinic protons, more preferably less than 10% olefinic protons, more preferably less than 9% olefinic protons, more preferably less than 8% olefinic protons, more preferably less than 7% olefinic protons, and more preferably less than 6% olefinic protons. As used herein, substantially hydrogenated means that the material contains less than 5% olefinic protons, more preferably less than 4% olefinic protons, more preferably less than 3% olefinic protons, more preferably less than 2% olefinic protons, more preferably less than 1% olefinic protons, more preferably less than 0.5% olefinic protons, more preferably less than 0.1% olefinic protons, and more preferably less than 0.05% olefinic protons after hydrogenation (and before reaction with the graft monomer).

Crosslinking Agents, Curatives, Cure Packages, and Curing

The elastomeric compositions and the articles made from those compositions are generally manufactured with the aid of at least one cure package, at least one curative, at least one crosslinking agent, and/or undergo a process to cure the elastomeric composition. As used herein, at least one curative package refers to any material or method capable of imparting cured properties to a rubber as is commonly understood in the industry.

Generally, polymer blends are crosslinked to improve the mechanical properties of the polymer. Physical properties, performance characteristics, and durability of vulcanized rubber compounds are known to be related to the number (crosslink density) and type of crosslinks formed during the vulcanization reaction.

The compositions may be vulcanized (cured) by any suitable means, such as subjecting them to heat or radiation according to any conventional vulcanization process. The amount of heat or radiation needed is that which is required to affect a cure in the composition, and the invention is not herein limited by the method and amount of heat required to cure the composition. Typically, the vulcanization is conducted at a temperature ranging from about 100° C. to about 250° C. in one embodiment, from about 150° C. to about 200° C. in another embodiment, for about 1 to 150 minutes.

Polymer blends may be crosslinked by adding curative agents, for example sulfur, metals, metal oxides such as zinc oxide, peroxides, organometallic compounds, radical initiators, fatty acids, and other agents common in the art. Zinc oxide, typically at 5 phr, is added to form zinc halide that then acts as the catalyst for the vulcanization of resin cured butyl rubber compounds. Good dispersion of the ZnO is critical for improved tire curing bladder life. Other known methods of curing that may be used include, peroxide cure systems, resin cure systems, and heat or radiation-induced crosslinking of polymers. Accelerators, activators, and retarders may also be used in the curing process.

In one preferred embodiment, a reactive alkyl phenol-formaldehyde resin cure system is employed. Resin cured butyl rubber compounds may display better resistance to detrimental effects of exposure to high temperatures when compared with sulfur cured butyl rubber vulcanizates, which tend to soften during prolonged exposure at elevated temperatures (e.g., 150° C. to 200° C.). The resin cure mechanism in butyl rubber is based on the reaction of the methylol groups in the phenol-formaldehyde resin with allylic hydrogen in butyl, usually with a Lewis acid catalyst, to yield carbon-carbon crosslinks that are thermally stable. Tire curing bladders are cured by alkylphenol formaldehyde derivatives containing methylol groups. The crosslinking of butyl rubber in resin-cured systems is dependent on the reactivity of the phenolmethylol groups of reactive alkyl phenol-formaldehyde resins, e.g., octylphenol formaldehyde resin. The low levels of unsaturation of butyl can benefit from resin cure activation by adding halogen containing materials such as $SnCl_2$ or halogen-containing elastomers such as polychloroprene. A more reactive resin cure system requiring no external activator is obtained if some of the hydroxyl groups of the methylol group are replaced by bromine. An example of commonly used commercial resin is a brominated alkyl phenol formaldehyde resin. While using brominated reactive resin, the bladder compound does not require an external source of halogen such as polychloroprene. However when using such resins, compound tack can increase resulting in the need to conduct additional factory compound process development.

Halogen-containing elastomers may be crosslinked by their reaction with metal oxides. Polychloroprene is an example of a halogenated elastomer that can be used, with or without a reactive alkyl phenol-formaldehyde resin, to cure butyl rubbers. Examples of useful metal oxides include, but are not limited to, ZnO, CaO, and PbO. The metal oxide can be used alone or in conjunction with its corresponding metal fatty acid complex (e.g., zinc stearate, calcium stearate, etc.), or with the organic and fatty acids added alone, such as stearic acid, and optionally other curatives such as sulfur or a sulfur compound, an alkylperoxide compound, diamines or derivatives thereof.

Sulfur is the most common chemical vulcanizing agent for diene-containing elastomers. The sulfur vulcanization system may consist of an activator to activate the sulfur, an accelerator, and a retarder to help control the rate of vulcanization.

Activators are chemicals that increase the rate of vulcanization by reacting first with the accelerators to form rubber-soluble complexes which then react with the sulfur to form sulfurating agents. General classes of accelerators include amines, diamines, guanidines, thioureas, thiazoles, thiurams, sulfenamides, sulfenimides, thiocarbamates, xanthates, and the like.

Accelerators help control the onset of and rate of vulcanization, and the number and type of crosslinks that are formed. Retarders may be used to delay the initial onset of cure in order to allow sufficient time to process the unvulcanized rubber.

The acceleration of the vulcanization process may be controlled by regulating the amount of the acceleration accelerant, often an organic compound. The mechanism for accelerated vulcanization of natural rubber, BR, and SBR involves complex interactions between the curative, accelerator, activators, and polymers. Ideally, the entire available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), benzothiazyl disulfide (MBTS), N-t-butyl-2-benzothiazole sulfenamide (TBBS), N-cyclohexyl-2-benzothiazole-sulfenamide (CBS), and thioureas.

In one embodiment of the invention, at least one curing agent(s) is present from 0.2 phr to 10 phr, or from 0.5 phr to 5 phr, or in another embodiment from 0.75 phr to 2 phr.

Fillers and Additives

The elastomeric compositions produced in accordance with the present invention typically contain other components and additives customarily used in rubber compounds, such as effective amounts of other processing aids, pigments, accelerators, cross-linking and curing materials, antioxidants, antiozonants, fillers, and/or clays.

In addition to HPM the elastomeric compositions may optionally include other useful processing aids such as, for example, plastomers, polybutene, or mixtures thereof. Castor oil, typically at 5 phr, is the most commonly used plasticizer for bladder compounds due to its low volatility at high temperature. Castor oil reduces the tendency for a marching modulus in resin cured butyl rubber bladder compounds. Additionally it gives lower unaged modulus and good steam aging. If castor oil is not available, then oleic acid (5 phr) could be used. Compounds containing either castor oil or oleic acid have better release properties between the bladder and tire inner liner. These compounds also show better retention in aging properties due to the high boiling point and lower volatility of castor oil. Alternatively if castor oil is not available paraffinic process oils (e.g., FLEXON 876) could be used though caution is required.

In one embodiment, however, the HPM can serve as a replacement for the castor oil or process oil, and the amount of castor oil used may be reduced accordingly. In one embodiment, the elastomeric formulation is essentially free of castor oil and processing oil, i.e., less than 0.1 phr castor oil and processing oil.

In addition to comprising at least one elastomer and at least one HPM, the elastomeric compositions may also optionally comprise at least one filler, for example, calcium carbonate, clay, mica, silica, silicates, talc, titanium dioxide, aluminum oxide, zinc oxide, starch, wood flour, carbon black, or mixtures thereof. The fillers may be any size and typically range, for example, in the tire industry, from about 0.0001 µm to about 100 µm.

In one preferred embodiment, carbon black is employed as the filler. The filler may be carbon black or modified carbon black. The filler may also be a blend of carbon black and silica. In one embodiment, the elastomeric composition is a tire tread or sidewall and comprises reinforcing grade carbon black at a level of from 10 phr to 100 phr of the blend, more preferably from 30 phr to 80 phr in another embodiment, and in yet another embodiment from 50 phr to 80 phr. Useful grades of carbon black include the ranges of from N110 to N990.

In general for curing bladders, high structure carbon black ISAF or HAF (e.g., N330) which give a good balance of properties, are used in bladder compounds at levels of 50 phr to 60 phr. Other alternative types of carbon black are the GPF grades which show improved air aging, though ISAF grades have better steam aging properties. Acetylene black compounds in combination with, for example, N330 have good thermal conductivity which may reduce tire curing time. However, acetylene black may be difficult to disperse in the butyl rubber compound. Generally, a lower loading of carbon black (e.g., 35 phr) gives better air aging and higher loading of carbon black (e.g., 65 phr) gives better steam aging.

In one embodiment, the amount of carbon black or other filler can be adjusted to control the viscosity of the elastomeric formulation, e.g., where the HPM is present in a sufficient amount to reduce the viscosity, such as more than about 5 phr or more than about 10 phr, the amount of the carbon black can be increased to raise or restore the viscosity.

As used herein, silica is meant to refer to any type or particle size silica or another silicic acid derivative, or silicic acid, processed by solution, pyrogenic, or like methods, including untreated, precipitated silica, crystalline silica, colloidal silica, aluminum or calcium silicates, fumed silica, and the like. Precipitated silica can be conventional silica, semi-highly dispersible silica, or highly dispersible silica.

The elastomeric composition may also include clay. The clay may be, for example, montmorillonite, nontronite, beidellite, vokoskoite, laponite, hectorite, saponite, sauconite, magadite, kenyaite, stevensite, vermiculite, halloysite, aluminate oxides, hydrotalcite, or mixtures thereof, optionally, treated with modifying agents. The clay may contain at least one silicate. Alternatively, the filler may be a layered clay, optionally, treated or pre-treated with a modifying agent such as organic molecules; the layered clay may comprise at least one silicate.

Generally, antioxidants are not effective in improving heat resistance of resin cured butyl compounds. Some of the antioxidants (e.g. amines) could significantly retard the cure rate of regular butyl rubber compounds, sulfur based vulcanization systems, and resin curing system. In one embodiment, antioxidants are not added to the elastomeric composition. In another embodiment, the composition is substantially free of added antioxidants, e.g., less than 0.1 phr.

Depending on the equipment, resin cure bladder compounds may be difficult to mix and process. To facilitate good dispersion and flow properties, it may be beneficial to use process aids such as organosilicone compounds. There are several commercially available process aids such as organosilicones and calcium fatty acid soaps suitable for curing bladder compounds.

One or more crosslinking agents are preferably used in the elastomeric compositions of the present invention, especially when silica is the primary filler, or is present in combination with another filler. Crosslinking and curing agents include sulfur, zinc oxide, and fatty acids. More preferably, the coupling agent may be a bifunctional organosilane crosslinking agent. An "organosilane crosslinking agent" is any silane coupled filler and/or crosslinking activator and/or silane reinforcing agent known to those skilled in the art including, but not limited to, vinyl triethoxysilane, vinyl-tris-(beta-methoxyethoxy)silane, methacryloylpropyltrimethoxysilane, gamma-amino-propyl triethoxysilane (sold commercially as A1100 by Witco), gamma-mercaptopropyltrimethoxysilane (A189 by Witco) and the like, and mixtures thereof. In one embodiment, bis-(3-triethoxysilypropyl)tetrasulfide (sold commercially as "Si69") is employed.

Processing

The inventive elastomeric composition may be compounded (mixed) by any conventional means known to those skilled in the art. The mixing may occur in a single step or in multiple stages. For example, the ingredients are typically mixed in at least two stages, namely at least one non-productive stage followed by a productive mixing stage. The final curatives are typically mixed in the final stage which is conventionally called the "productive" mix stage. In the productive mix stage the mixing typically occurs at a temperature, or ultimate temperature, lower than the mix temperature(s) of the preceding non-productive mix stage(s). The elastomers, polymer additives, silica and silica coupler, and carbon black, if used, are generally mixed in one or more non-productive mix stages. The terms "non-productive" and "productive" mix stages are well known to those having skill in the rubber mixing art.

In one embodiment, the carbon black is added in a different stage from zinc oxide and other cure activators and accelerators. In another embodiment, antioxidants, antiozonants, and processing materials are added in a stage after the carbon black has been processed with the elastomers, and zinc oxide is added at a final stage to maximize the compound modulus. In a further embodiment, mixing with the clays is performed by techniques known to those skilled in the art, wherein the clay is added to the polymer at the same time as the carbon black. In other embodiments, additional stages may involve incremental additions of one or more fillers.

In another embodiment, mixing of the components may be carried out by combining the elastomer components, filler and clay in any suitable mixing device such as a two-roll open mill, BRABENDER™ internal mixer, BANBURY™ internal mixer with tangential rotors, Krupp internal mixer with intermeshing rotors, or preferably a mixer/extruder, by techniques known in the art. Mixing may be performed at temperatures up to the melting point of the elastomer(s) used in the composition in one embodiment, or from 40° C. to 250° C. in another embodiment, or from 100° C. to 200° C. in yet another embodiment. Mixing should generally be conducted under conditions of shear sufficient to allow any clay to exfoliate and become uniformly dispersed within the elastomer (s).

Typically, from 70% to 100% of the elastomer or elastomers is first mixed for 20 to 90 seconds, or until the temperature reaches from 40° C. to 75° C. Then, approximately 75% of the filler, and the remaining amount of elastomer, if any, are typically added to the mixer, and mixing continues until the temperature reaches from 90° C. to 150° C. Next, the remaining filler is added, as well as the processing aids, and mixing continues until the temperature reaches from 140° C. to 190° C. The masterbatch mixture is then finished by sheeting on an open mill and allowed to cool, for example, to from 60° C. to 100° C. when curatives may be added.

Industrial Applicability

The elastomeric compositions of the invention may be extruded, compression molded, blow molded, injection molded, and laminated into various shaped articles including fibers, films, laminates, layers, industrial parts such as automotive parts, appliance housings, consumer products, packaging, and the like.

In particular, the elastomeric compositions are useful in articles for a variety of tire applications such as truck tires, bus tires, automobile tires, motorcycle tires, off-road tires, aircraft tires, and the like. Such tires can be built, shaped, molded, and cured by various methods which are known and will be readily apparent to those having skill in the art. The elastomeric compositions may either be fabricated into a finished article or a component of a finished article such as an innerliner for a tire. The article may be selected from air barriers, air membranes, films, layers (microlayers and/or multilayers), innerliners, inner tubes, air sleeves, sidewalls, treads, tire curing bladders, and the like. The elastomeric composition may be particularly useful in a tire curing bladder.

The elastomeric compositions of the present invention are useful in a variety of applications, particularly pneumatic tire components, hoses, belts such as conveyor belts or automotive belts, solid tires, footwear components, rollers for graphic arts applications, vibration isolation devices, pharmaceutical devices, adhesives, caulks, sealants, glazing compounds, protective coatings, air cushions, pneumatic springs, air bellows, accumulator bags, and bladders for fluid retention and curing processes. They are also useful as plasticizers in rubber formulations; as components to compositions that are manufactured into stretch-wrap films; as dispersants for lubricants; and in potting and electrical cable filling and cable housing materials.

The elastomeric compositions may also be useful in molded rubber parts and may find wide applications in automobile suspension bumpers, auto exhaust hangers, and body mounts. In yet other applications, the elastomer(s) or elastomeric compositions of the invention are also useful in medical applications such as pharmaceutical stoppers and closures and coatings for medical devices.

Tire Curing Bladder Manufacture

The curing bladder is a cylindrical bag usually made from a specially compounded butyl rubber containing a poly-methylolphenol resin or other cure system. In use, this collapsible bladder is mounted in the lower section of the tire curing press and forms a part of the press and mold assembly. The "green" unvulcanized tire is positioned over the bladder in the bottom half of the mold. When the mold is closed, pressurized steam, air, hot water, or inert gas (nitrogen) is introduced systematically (pre-programmed) into the bladder to provide internal heat and pressure for the tire shaping and curing process. Two typical types of tire curing presses which require bladders are: Slideback (NRM or similar) type press which requires an AutoForm (Bagwell) bladder, and Tiltback (Bag-O-Matic or similar) type press which requires a Bag-O-Matic bladder. Examples of tire curing bladders include wall curing bladders for passenger cars, light trucks and commercial trucks, toroidal curing bladders, closed end curing bladders, and the like.

Three types of tire cure cycles can be found, a steam—high pressure hot water cure cycle, a steam—inert gas cure process, and a steam—steam cure cycle. Dome temperatures can reach 190° C. (mold sidewall plates at 180° C.) and the bladder temperatures can reach up to 220° C. An exemplary simple steam—hot water cure cycle time for a truck tire might be (1) steam 12 minutes; (2) high pressure hot water 30 minutes; (3) cold water flush 4 minutes; and (4) drain 30 seconds, for a total cure time of 46:30. Butyl rubber is used for the curing bladder since it generally meets the basic property requirements: (1) a homogeneous, well mixed compound for ease of processing (mixing, extruding, and mold flow); (2) excellent heat aging resistance; (3) resistance to degradation due to saturated steam or high pressure hot water, or inert gas; (4) excellent flex and hot tear resistance; (5) low tension and compression set that maintains high elongation properties; and (6) impermeability to air, inert gas, and water vapor. Attainment of these properties enables a curing bladder to achieve an adequate service life, i.e., number of tire cure cycles which is commonly referred to as the pull-point. The pull-point is where the bladder is removed before failure; thereby preventing failures during tire cure cycles which can lead to the loss of tires during production.

The selection of compounding ingredients used in the manufacture of the curing bladder is very important with respect to bladder life. In an embodiment, the curing bladder is made from an elastomeric composition comprising butyl rubber compounded with a cure system, filler, plasticizer comprising the HPM, and other additives. The butyl rubber employed is typified as a copolymer of isobutylene and approximately 2 mol % isoprene, e.g., 1.05 mol % to 2.30 mol % isoprene, and is commercially available under the EXXON™ trade designations Butyl 065, Butyl 068, Butyl 268 and the like. The cure system in one embodiment comprises a curing resin such as reactive alkyl phenol formaldehyde resin, for example, a zinc source compound such as zinc oxide with stearic acid and/or zinc stearate, and a cure activator, such as, for example, polychloroprene resin. In another embodiment a halogenated curing resin can be used where the halogens from the halogenated alkyl phenol formaldehyde act as a cure activator without any added polychloroprene. The filler is typically carbon black. The plasticizer according to an embodiment comprises an HPM described herein, and can also include a processing oil such as castor oil, for example.

The service conditions of the tire curing bladder are unique. It is subjected to severe conditions of heat, pressure and flexing. Therefore, good dispersion of the ingredients, especially carbon black, zinc oxide, any polychloroprene and curing resin, is very important to achieve adequate service life. A good dispersion of the compounding ingredients can improve physical properties and also retention of physical properties.

A manufacturing process flowchart for an exemplary tire curing bladder is illustrated in FIG. 1. Briefly, the major processing steps are masterbatch mixing 1, straining 2, final batch mixing 3, extrusion of slugs/blanks 4, cutting of slugs/blanks 5, blank splicing 6, vulcanization 7, which can be, for example, either compression molding or injection molding, post-cure or conditioning 8, and storage of bladders 9. Not every step in this comprehensive schematic of curing bladder production may be necessary. For example, use of high quality butyl rubber and compounding materials may eliminate the need for straining. Modern cold feed extruders can eliminate the need for warm-up mills. However, strainers on the extruder die can represent good practice and may help in obtaining a more uniform extrudate.

Butyl rubber in an embodiment is primarily a saturated polyisobutylene copolymer with about 1 mol % to 3 mol % of isoprene, e.g., 1.05 mol % to 2.30 mol % of isoprene. It is important to avoid contamination of unsaturated elastomers such as natural rubber, SBR and polybutadiene rubber with butyl rubber. Due to the difference in the state of cure between butyl and other unsaturated elastomers, contamination could lead to loss in compound physical properties. Bale cutters, internal mixers, two roll open mills, strainers, and extruders which are used to process butyl rubber and other unsaturated rubbers should be cleaned thoroughly with a clean-out compound.

Tire Curing

Figure 2:
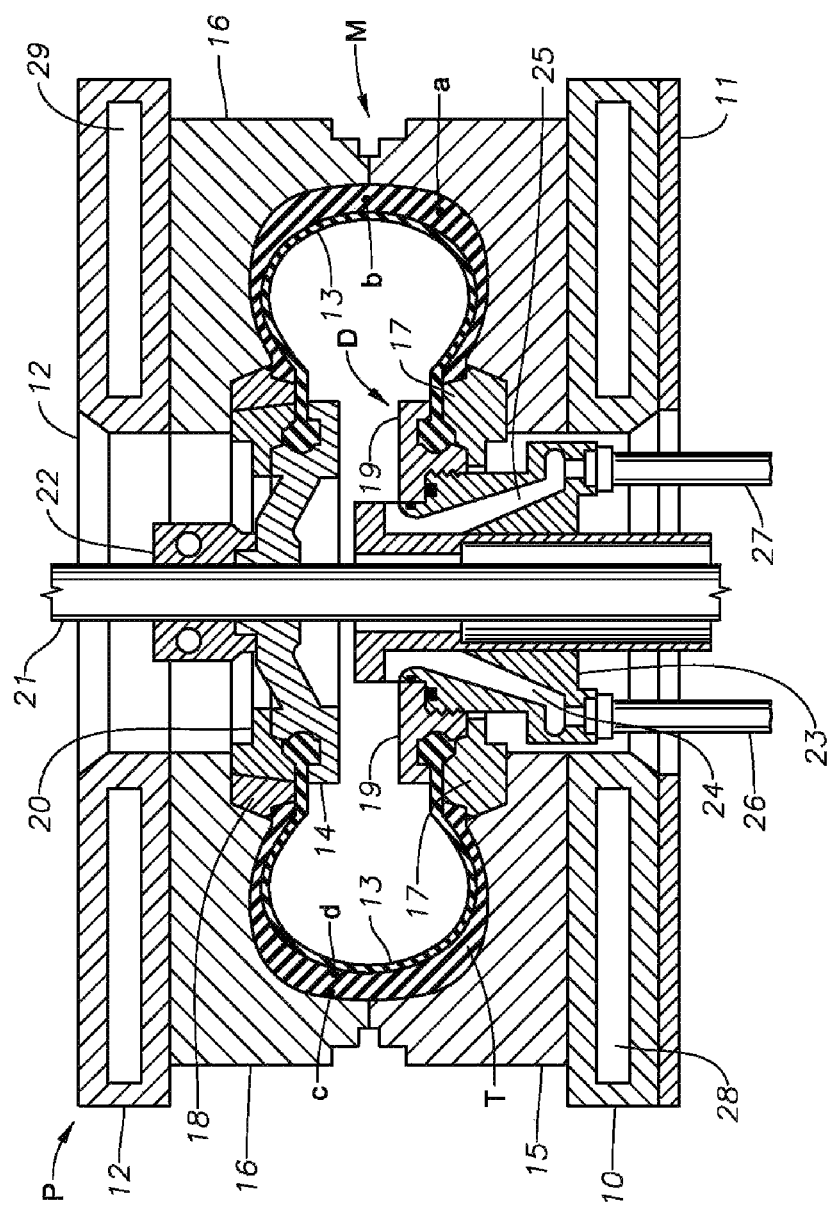
FIG. 2 is a partial vertical cross-sectional view of a tire vulcanization press equipped with a tire curing bladder according to an embodiment of the invention.

Referring to FIG. 2 there is shown a typical platen press P and a tire mold M during curing of a typical tire T, with which the skilled artisan will be readily familiar. The drawing is schematic with parts omitted, and the mold and the press are not necessarily drawn to scale. The platen press P may be a standard type of "Bag-O-Matic" press substantially as shown and described, for example, in U.S. Pat. No. 2,808,618 and other patents of L. E. Soderquist. Alternatively, the press may be another type of press, such as, for example, one using an "AutoForm" tire curing bladder, or an injection molding press.

In the embodiment of FIG. 2, the press P includes a fixed platen 10, a bed 11 and a platen 12 rigidly mounted on the movable upper portion of the press. The entire upper assembly can be raised, lowered and tilted. A bladder mechanism D comprising a curing bladder 13 is provided at the center of the press. The upper and lower halves 15 and 16 of the tire mold M are rigidly connected to the platens 10 and 12. A plurality of vent passages extend from the toroidal mold cavity to the exterior of the mold. The bladder mechanism D has lower and upper bead positioning rings 17 and 18 and a lower diaphragm clamping ring 19. Upper diaphragm clamping rings 14 and 20 fit within the bead ring 18. Clamping rings 14 and 20 are moved vertically by a piston rod 21 having an attaching collar 22. An annular support member 23 has a pair of passages 24 and 25 in communication with inlet and outlet conduits 26 and 27 to permit free flow of water and steam to and from the bladder 13. Each of said passages may have a cross section elongated in the circumferential direction.

In operation, the tire press P is loaded with the "green" tire construct which is placed over the cure bladder 13, and the press is closed. The press P is heated by supplying steam to the annular chambers 28 and 29 of the lower and upper platens, and, if desired, the heating may be continuous to maintain a substantially constant temperature.

The steam pressure and temperature is regulated to assure adequate curing at the point of least cure in the tire, typically a point 'a' in the tread shoulders (see FIG. 2). Point 'b' identifies a point near the crown of a tire, point 'c' one on its outer surface, and point 'd' one on the inner surface of the carcass. The precise time set for each stage is arrived at by trial and error for a particular rubber compound used in a specified tire size, so that the maximum permissible vulcanizing temperature at the point of least cure is not exceeded.

When the cured tire is removed from the curing press, the tire curing bladder is collapsed to pull away from the tire. Then the tire is raised over the retracted bladder and dropped onto a cooling rail for several minutes before being transferred to final inspection.

Since the bladder is mechanically stretched and folded at temperatures up to and sometimes above 200° C. with each cure cycle, avoidance of stress concentrations is important. The most effective approach from the bladder design perspective is to reduce the gauge of the bladder wall. In injection molding processes, the bladder wall thicknesses can be reduced to 4.0 to 5.0 mm for passenger tire applications, for example. The primary purpose of the bladder is to prevent steam from leaking into the innerliner or tire casing. Since heat is transferred through the bladder, there is a requirement to make the bladder wall as thin as possible, while maintaining necessary mechanical properties. If the bladder is too thin it may rupture during service. If it is too thick it will reduce heat transfer, extending the cure time, and also there is a risk the clamp area may be damaged.

The bladder surface design is typically a function of several factors, e.g., the tire manufacturer may use the design as trade mark or as a unique company characteristic, the design may be chosen to permit ease of venting trapped air between the green tire and the bladder as the mold closes and/or the design may improve the uniformity of the tire innerliner surface appearance. Frequently the chosen bladder design will meet these parameters. Some venting is necessary and typically runs from the crown area b to the bead region. Venting channels, if required, may be molded into the bladder surface and vent markings desirably are clean, have no flash, and are such that no foreign material can become trapped on the bladder surface, which may cause a weak spot and upon subsequent flexing the bladder may fail, particularly if the mold flash or other material is covered, over-cured, or covered with a layer of mold release. Bladder vent marks can also affect inner tube durability, which may be taken into consideration for tube type tires.

For tubeless tire—bladder combinations, good venting is generally more important. The design of etching on the bladder is chosen to allow the venting of air trapped between the "green" unvulcanized tire and the bladder during the press and mold closing operation. Generally venting runs from the crown area b of the bladder to the bead area. Venting channels are preferably molded into the bladder surface. In addition, irregularities such as stamping information on the bladder wall can create flaws in the tire innerliner which can then be a site for crack initiation. Any markings or emblems are preferably therefore designed to prevent any later product performance concerns.

While tire manufacturers generally want longer bladder service lives, service conditions are also becoming more extreme, such as, for example, higher tire curing temperatures in some instances exceeding 200° C., shorter tire cure cycles for example under 10 minutes for passenger tires and a service life significantly over 500 cure cycles for passenger tires.

Accordingly, the invention provides the following embodiments:

A. An elastomeric composition comprising 100 parts by weight of elastomer, a curative, and from 1 phr to 50 phr of a hydrocarbon polymer modifier ("HPM"), wherein the elastomer comprises at least one isobutylene based elastomer, wherein the HPM comprises monomers selected from the group consisting of piperylenes, cyclic pentadienes, aromatics, limonenes, pinenes, amylenes, and combinations thereof, and wherein the cyclic pentadienes comprise at least 10 weight percent of the monomers by total weight of the monomers.

B. The elastomeric composition according to embodiment A, wherein the elastomer comprises at least 70 mole percent of a $C_4$ to $C_7$ isomonoolefin derived unit.

C. The elastomeric composition according to embodiment A or embodiment B, wherein the curative comprises from 1 phr to 12 phr of a halogenated phenolic resin curative, polychloroprene or a combination thereof.

D. The elastomeric composition according to any one of embodiments A, B or C, wherein the curative further comprises zinc oxide and stearic acid.

E. The elastomeric composition according to any one of embodiments A to D, further comprising carbon black.

F. The elastomeric composition according to any one of embodiments A to E, wherein the cyclic pentadienes comprise at least 50 weight percent of the monomers by total weight of the monomers.

G. The elastomeric composition according to any one of embodiments A to F, wherein the HPM comprises a Ring & Ball softening point of from 100° C. to 140° C.

H. The elastomeric composition according to any one of embodiments A to G, wherein the HPM is at least partially hydrogenated.

I. The elastomeric composition according to any one of embodiments A to H, wherein the HPM comprises less than 1 percent olefinic protons based on the total protons in the HPM.

J. The elastomeric composition according to any one of embodiments A to I, wherein the HPM comprises less than 10 percent aromatic protons based on the total protons in the HPM.

K. The elastomeric composition according to any one of embodiments A to J, wherein the elastomeric composition comprises an average aged (3 days at 100° C., 7 days at 100° C. and 3 days at 125° C.) tensile strength retention less than about 130 percent, an average aged (3 days at 100° C., 7 days at 100° C. and 3 days at 125° C.) tear strength retention less than about 110 percent, an air permeation coefficient less than about 150 cc*mm/($m^2$·day), a fatigue life of at least 700 kilocycles, and a DeMattia cut growth less than about 10 mm.

L. The elastomeric composition according to any one of embodiments A to K, wherein the elastomeric composition is vulcanized.

M. A curing bladder comprising the elastomeric composition according to any one of embodiments A to L.

N. A tire curing press comprising the curing bladder according to embodiment M disposed therein.

O. A method of making a tire curing bladder, comprising mixing the elastomeric composition according to any one of embodiments A to J and molding and curing the mixture into the shape of a tire curing bladder.

P. In a process of making a tire curing bladder comprising mixing an elastomer mixture comprising an elastomer, a curative and from 1 to 50 phr of a plasticizer, and molding and curing the mixture into the shape of a tire curing bladder, a method to improve processability of the mixture and fatigue life and DeMattia cut growth of the cured mixture, wherein the method comprises incorporating an HPM into the elastomeric mixture as at least a portion of the plasticizer, wherein the elastomeric mixture comprises the elastomeric composition according to any one of embodiments A to J.

Q. The method according to embodiment 0 or embodiment P, wherein the cured mixture comprises an average aged (3 days at 100° C., 7 days at 100° C. and 3 days at 125° C.) tensile strength retention less than about 130 percent, an average aged (3 days at 100° C., 7 days at 100° C. and 3 days at 125° C.) tear strength retention less than about 110 percent, an air permeation coefficient less than about 150 cc*mm/($m^2$·day), a fatigue life of at least 700 kilocycles, and a DeMattia cut growth less than about 10 mm.

R. A method of using a tire curing press to make a tire, comprising: installing a tire curing bladder into the tire curing press, wherein the tire curing bladder comprises the curing bladder according to embodiment M; loading an uncured hydrocarbon rubber composition into a mold of the tire curing press between the curing bladder and a mold surface; closing the mold and expanding the curing bladder therein to press the uncured hydrocarbon rubber composition against the mold surface; curing the hydrocarbon rubber composition under conditions of heat and pressure; deflating the curing bladder; and removing the cured hydrocarbon rubber composition from the mold.

S. In a process using a tire curing press to make a tire, comprising installing a tire curing bladder into the tire curing press and repetitively loading an uncured hydrocarbon rubber composition into a mold of the tire curing press between the curing bladder and a mold surface, closing the mold and expanding the curing bladder therein to press the uncured hydrocarbon rubber composition against the mold surface, curing the hydrocarbon rubber composition for a period of time under conditions of heat and pressure, deflating the curing bladder and removing the cured hydrocarbon rubber composition from the mold, a method to extend a pull point of the curing bladder, to reduce the curing time for the hydrocarbon rubber composition, or both, comprising installing a tire curing bladder into the press, wherein the tire curing bladder comprises the curing bladder according to embodiment M.

EXAMPLES

The components used in these examples are described in Table 1 below.

TABLE 1

| Material Designation | Material | Commercial Name/ Potential Source (if applicable) |
|---|---|---|
| Butyl 268 | poly(isobutylene-co-isoprene), Mooney viscosity 46-56 (ML 1 + 8 at 125° C., ASTM D1646, modified) | ExxonMobil Chemical Company |
| Castor oil | Castor oil plasticizer | |
| Neoprene W | Polychloroprene resin cure activator | DuPont de Nemours |
| Stearic acid | Stearic acid zinc oxide activator | F1000 |
| HPM1 | Aliphatic hydrocarbon resin, Ring & Ball softening point 95-105° C. (<5 wt % dicyclopentadiene) | |
| HPM2 | Aliphatic/aromatic hydrocarbon resin (<5 wt % dicyclopentadiene, <10 wt % aromatics), Ring & Ball softening point 85-90° C., Mn of 800 to 900 | |
| HPM3 | Cycloaliphatic hydrocarbon resin (>50 wt % dicyclopentadiene, <5 wt % aromatics), Ring & Ball softening point 120-125° C., Mn of 350-450, Brookfield melt viscosity of 4500-5500 cps @ 160° C. | |
| ZnO | Zinc oxide curative | KADOX 911 or 920; Horsehead Corporation |
| SP-1045 | Heat reactive octylphenol formaldehyde resin, cure accelerator | SI Group, Inc. |

The compound formulations shown in Table 2 below are based on a standard curing bladder formula, and were mixed in a laboratory BANBURY mixer, size BR.

TABLE 2

Formulations

| | Compound | | | |
|---|---|---|---|---|
| | 1 | 2 | 3 | 4 |
| Butyl 268 | 100.00 | 100.00 | 100.00 | 100.00 |
| N330 | 50.00 | 50.00 | 50.00 | 50.00 |
| Castor oil | 5.00 | 5.00 | 5.00 | 5.00 |
| Neoprene W | 5.00 | 5.00 | 5.00 | 5.00 |
| Stearic acid | 1.00 | 1.00 | 1.00 | 1.00 |
| HPM1 | | 10.00 | | |
| HPM2 | | | 10.00 | |
| HPM3 | | | | 10.00 |
| ZnO | 5.00 | 5.00 | 5.00 | 5.00 |
| SP-1045 | 10.00 | 10.00 | 10.00 | 10.00 |

Figure 3:
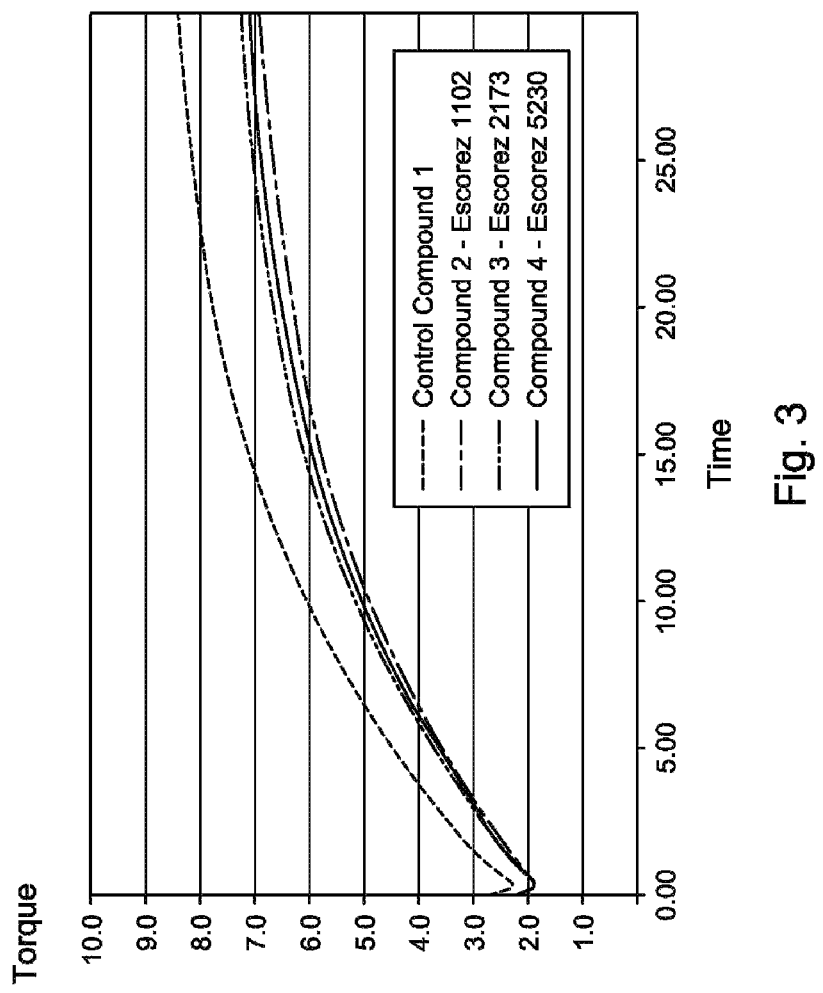
FIG. 3 compares the cure kinetics for curing bladder compositions according to embodiments against a control composition.

Table 3 below and FIG. 3 show the Mooney viscosity and rheometer cure kinetics for the four compounds. Briefly, the compound cure kinetics were measured using a moving die rheometer (MDR) as described in ASTM D5289. The values "MH" and "ML" used here and throughout the description refer to "maximum torque" and "minimum torque", respectively. The "MS" value is the Mooney scorch value, and the "ML(1+4)" value is the Mooney viscosity value. Mooney and scorch time was measured by ASTM D1646 (modified). The error (2a) in the later measurement is ±0.65 Mooney viscosity units. The times at 10% cure (t10) and 90% cure (t90) provide information about the beginning and ending of the cure reaction.

TABLE 3

Processing and cure data

| | Compound | | | |
|---|---|---|---|---|
| | 1 | 2 | 3 | 4 |
| Mooney ML(1 + 8) + Stress Relax Viscosity at 1 + 4 (MU) | 74 | 62.4 | 63.1 | 64.4 |
| MDR Rheometer, 160° C. | | | | |
| MH-ML (dNm) | 5.24 | 4.27 | 4.56 | 4.36 |
| t10 (minutes) | 1.77 | 1.99 | 2.5 | 2.11 |
| t90 (minutes) | 46.89 | 47.66 | 47.66 | 47.35 |
| Peak Rate (dNm/min) | 0.5 | 0.34 | 0.32 | 0.32 |
| MDR Rheometer, 180° C. | | | | |
| MH-ML (dNm) | 6.14 | 5.05 | 5.37 | 5.21 |
| t10 (minutes) | 1.27 | 1.34 | 1.49 | 1.37 |
| t90 (minutes) | 20.36 | 21.06 | 20.61 | 20.7 |
| Peak Rate (dNm/min) | 0.88 | 0.65 | 0.61 | 0.67 |

Compared to the control compound 1, addition of the HPM1-3 resins reduced the viscosity, suggesting improved ease of processing and better mixing and dispersion. Cure kinetics were satisfactory, the reduced MDR rheometer delta torque being due to the increased plasticizing effect of the HPM1-3 resins as seen in FIG. 2. These data imply that the HPM can be used as an extender, requiring less butyl rubber in the overall composition.

Samples were aged for 3 days at 100° C. and 125° C., and for 7 days at 100° C., in an air oven. Testing results for selected tensile properties measured according to ASTM D412 Die C at room temperature using an INSTRON 4202 tester are shown in Table 4 below.

TABLE 4

Aged tensile strength retention

| | Compound | | | |
|---|---|---|---|---|
| | 1 | 2 | 3 | 4 |
| Tensile strength, MPa | 9.716 | 8.92 | 11.705 | 11.452 |
| Elongation, % | 787 | 840 | 811 | 829 |
| 300% Modulus, MPa | 2.954 | 2.378 | 3.001 | 2.953 |
| Aged 3 days at 100° C. | | | | |
| Tensile strength, MPa | 13.809 | 13.72 | 14.054 | 13.749 |
| Elongation, % | 673.07 | 668.72 | 708.36 | 718.54 |
| 300% Modulus, MPa | 6.325 | 5.176 | 5.699 | 4.812 |
| Aged 7 days at 100° C. | | | | |
| Tensile strength, MPa | 13.611 | 12.93 | 13.043 | 13.179 |
| Elongation, % | 602.29 | 638.99 | 633.57 | 659.62 |
| 300% Modulus, MPa | 7.004 | 5.815 | 6.165 | 5.76 |
| Aged 3 days at 125° C. | | | | |
| Tensile strength, MPa | 13.031 | 13.265 | 12.78 | 11.517 |
| Elongation, % | 508.54 | 616.04 | 565.22 | 486.46 |
| 300% Modulus, MPa | 8.881 | 7.347 | 7.658 | 7.332 |
| Aged tensile strength retention, tensile strength rating vs. original | | | | |
| 3 days at 100° C., % | 142 | 154 | 120 | 120 |
| 7 days at 100° C., % | 140 | 145 | 111 | 115 |
| 3 days at 125° C., % | 134 | 149 | 109 | 101 |
| Average, % | 139 | 149 | 114 | 112 |

The foregoing data show that all three compounds containing the HPMs have higher elongation at break. The change in tensile strength with aging compared to its original tensile strength should be a minimum. It is seen for compounds 3 and 4 containing over 10 wt % dicyclopentadiene oligomer (HPM3) show the least, in contrast with the control compound 1. These data imply that the HPM improves the heat aging resistance and extends the pull point of curing bladders made therewith.

Tear strength retention was also studied and the data are shown in Table 5 below. Tear strength was determined according to ASTM D624 Die B.

TABLE 5

Tear strength retention

| | Compound | | | |
|---|---|---|---|---|
| | 1 | 2 | 3 | 4 |
| Tear strength, ASTM D624 Die B | | | | |
| Peak load, N | 126.48 | 109.41 | 119.42 | 122.5 |
| Tear resistance, N/mm | 60.227 | 50.833 | 59.709 | 60.343 |
| Tear strength, ASTM D624 Die B, aged 3 days at 100° C. | | | | |
| Peak load, N | 126.78 | 91.593 | 122.84 | 113.19 |
| Tear resistance, N/mm | 64.684 | 59.865 | 62.096 | 69.584 |
| Tear strength, ASTM D624 Die B, aged 7 days at 125° C. | | | | |
| Peak load, N | 128.1 | 116.72 | 112.94 | 128.06 |
| Tear resistance, N/mm | 65.693 | 60.166 | 70.728 | 63.714 |
| Tear strength, ASTM D624 Die B, aged 7 days at 100° C. | | | | |
| Peak load, N | 90.599 | 115.48 | 120.77 | 125.11 |
| Tear resistance, N/mm | 59.036 | 58.03 | 60.994 | 63.51 |
| Aged tear strength retention, tear resistance rating vs. original | | | | |
| 3 days at 100 C, % | 107 | 118 | 104 | 115 |
| 7 days at 100 C, % | 109 | 118 | 118 | 106 |
| 3 days at 125 C, % | 98 | 114 | 102 | 105 |
| Average, % | 105 | 117 | 108 | 109 |

Compounds 3 and 4 with dicyclopentadiene-containing HPMs both showed good tear strength retention with little shift in values compared to the original data.

Permeability was measured using a Mocon instrument. The oxygen transmission rate was measured under the principle of dynamic measurement of oxygen transport through a thin film. Compound samples were clamped into a diffusion cell. The samples were approximately 5.0 cm in diameter and about 0.5 mm thick. The cell was then purged of residual oxygen using a high purity nitrogen carrier gas. The nitrogen gas was routed to a sensor until a stable zero value was established. The measurement was typically conducted at 40° C. Pure oxygen air was then introduced into the outside of the chamber of the diffusion cell. The oxygen diffusing through the sample to the inside chamber was conveyed to a chamber which measures the oxygen diffusion rate. The oxygen diffusion rate is expressed as a transmission rate coefficient. The permeation coefficient as used herein is a measure of the transmission rate normalized for sample thickness (mm) and is expressed as a volume of gas (cc) per unit area of the sample ($m^2$) in a discrete unit of time (e.g., 24 hours), and has the units of cc*mm/($m^2$-day). The permeability coefficient as used herein considers atmospheric pressure and is expressed as cc*mm/($m^2$-day-mmHg). Results are shown in Table 6 below.

TABLE 6

Permeability

| | Compound | | | |
|---|---|---|---|---|
| | 1 | 2 | 3 | 4 |
| Permeation Coefficient, cc * mm/($m^2$ · day) | 145.37 | 156.72 | 148.36 | 132.43 |
| Permeability Coefficient, cc * mm/($m^2$ · day · mmHg) | 0.189 | 0.204 | 0.193 | 0.174 |
| Rating | 100 | 108 | 102 | 92 |

These results show that Compound 4 made with HPM3 had the lowest permeability with improvements between 5% and 10% compared to the control formulation, Compound 1, whereas Compound 2 had a higher permeability and Compound 3 was not significantly different than the control. This implies that the tire curing bladder made from the composition of Compound 4, quite surprisingly, is made 5% to 10% thinner, reducing the amount of butyl rubber used and still achieving the same level of barrier performance. A thinner curing bladder also facilitates heat transfer and improves cycle time in the tire building process.

Compounds 3 and 4 using HPM2 and HPM3, respectively, were tested for fatigue to failure. The results are shown in Table 7 below.

TABLE 7

Fatigue to failure and DeMattia cut growth

| | Compound | |
|---|---|---|
| | 3 | 4 |
| Fatigue life, kilocycles | 611 | 825 |
| DeMattia cut growth, mm | 10.6 | 8.13 |

This test is good for determining the effect of compound uniformity and long term stability. It can be seen that a compound containing a high proportion of cycloaliphatics (Compound 4) shows much better fatigue resistance, again suggesting better aging resistance.

Collectively the data show that the HPMs reduce the viscosity of the bladder compound, but have no effect on scorch resistance, and HPMs containing cycloaliphatics help maintain the tensile strength and tear strength of the original bladder compound. Hydrocarbon polymer modifiers can be used as a replacement for castor oil or other processing oils in bladder compound formulations. The addition of the HPM can be used as a compound extender to reduce the amount of butyl rubber used, and a filler such as carbon black can be used to adjust the compound viscosity. Cycloaliphatic-containing HPMs improve (reduce) permeability, fatigue life and cut growth resistance.

The invention has been described above with reference to numerous embodiments and specific examples. Many variations will suggest themselves to those skilled in this art in light of the above detailed description. All such obvious variations are within the full intended scope of the appended claims.

We claim:

1. A curing bladder comprising an elastomeric composition comprising 100 parts by weight of elastomer, a curative, and from 1 phr to 50 phr of a hydrocarbon polymer modifier, wherein the elastomer comprises at least one isobutylene based elastomer, wherein the hydrocarbon polymer modifier comprises monomers selected from the group consisting of piperylenes, cyclic pentadienes, aromatics, limonenes, pinenes, amylenes, and combinations thereof, and wherein the cyclic pentadienes comprise at least 10 weight percent of the monomers by total weight of the monomers, wherein the hydrocarbon polymer modifier has a number average molecular weight in the amount of about 350 g/mole to about 450 g/mole and a Ring and Ball Softening Point in the amount of about 120° C. to about 125° C.

2. The curing bladder of claim 1, wherein the isobutylene based elastomer comprises at least 70 mole percent of a $C_4$ to $C_7$ isomonoolefin derived unit.

3. The curing bladder of claim 1, wherein the curative comprises from 1 phr to 12 phr of one or a combination of a halogenated phenolic resin curative and polychloroprene.

4. The curing bladder of claim 1, wherein the curative comprises zinc oxide, stearic acid and one or both of a halogenated curing resin and polychloroprene.

5. The curing bladder of claim 1, wherein the cyclic pentadienes comprise at least 50 weight percent of the monomers by total weight of the monomers.

6. The curing bladder of claim 1, wherein the hydrocarbon polymer modifier is at least partially hydrogenated.

7. The curing bladder of claim 1, wherein the hydrocarbon polymer modifier comprises less than 1 percent olefinic protons based on the total protons in the hydrocarbon polymer modifier.

8. The curing bladder of claim 1, wherein the hydrocarbon polymer modifier comprises less than 10 percent aromatic protons based on the total protons in the hydrocarbon polymer modifier.

9. The curing bladder of claim 1, wherein the elastomeric composition further comprises carbon black.

10. The curing bladder of claim 1, wherein the elastomeric composition has an average aged (3 days at 100° C., 7 days at 100° C. and 3 days at 125° C.) tensile strength retention less than about 130 percent, an average aged (3 days at 100° C., 7 days at 100° C. and 3 days at 125° C.) tear strength retention less than about 110 percent, an air permeation coefficient less than about 150 cc*mm/($m^2$·day), a fatigue life of at least 700 kilocycles, and a DeMattia cut growth less than about 10 mm.

11. The curing bladder of claim 1, wherein the elastomeric composition is vulcanized.

12. The curing bladder of claim 11 disposed in a tire curing press to facilitate shaping and curing a rubber tire.

13. A method of making a tire curing bladder, comprising: mixing 100 parts by weight of elastomer, a curative, and from 1 phr to 50 phr of a hydrocarbon polymer modifier, wherein the elastomer comprises at least one isobutylene based elastomer, wherein the hydrocarbon polymer modifier comprises monomers selected from the group consisting of piperylenes, cyclic pentadienes, aromatics, limonenes, pinenes, amylenes, and combinations thereof, and wherein the cyclic pentadienes comprise at least 10 weight percent of the monomers by total weight of the monomers, wherein the hydrocarbon polymer modifier has a number average molecular weight in the amount of about 350 g/mole to about 450 g/mole and a Ring and Ball Softening Point in the amount of about 120° C. to about 125° C.; and
    molding and curing the mixture into the shape of a tire curing bladder.

14. The method of claim 13, wherein the cured mixture comprises an average aged (3 days at 100° C., 7 days at 100° C. and 3 days at 125° C.) tensile strength retention less than about 130 percent, an average aged (3 days at 100° C., 7 days at 100° C. and 3 days at 125° C.) tear strength retention less than about 110 percent, an air permeation coefficient less than about 150 cc*mm/($m^2$·day), a fatigue life of at least 700 kilocycles, and a DeMattia cut growth less than about 10 mm.

15. In a process of making a tire curing bladder comprising mixing 100 parts by weight of elastomer, a curative, and from 1 phr to 50 phr of a plasticizer, wherein the elastomer comprises at least one isobutylene based elastomer, and molding and curing the mixture into the shape of a tire curing bladder, a method to improve processability of the mixture and fatigue life and DeMattia cut growth of the cured mixture, comprising:
    incorporating a hydrocarbon polymer modifier into the mixture as at least a portion of the plasticizer, wherein the hydrocarbon polymer modifier comprises monomers selected from the group consisting of piperylenes, cyclic pentadienes, aromatics, limonenes, pinenes, amylenes, and combinations thereof, and wherein the cyclic pentadienes comprise at least 10 weight percent of the monomers by total weight of the monomers, wherein the hydrocarbon polymer modifier has a number average molecular weight in the amount of about 350 g/mole to about 450 g/mole and a Ring and Ball Softening Point in the amount of about 120° C. to about 125° C.

16. The improved method of claim 15, wherein the cured mixture comprises an average aged (3 days at 100° C., 7 days at 100° C. and 3 days at 125° C.) tensile strength retention less than about 130 percent, an average aged (3 days at 100° C., 7 days at 100° C. and 3 days at 125° C.) tear strength retention less than about 110 percent, an air permeation coefficient less than about 150 cc*mm/($m^2$·day), a fatigue life of at least 700 kilocycles, and a DeMattia cut growth less than about 10 mm.

17. A method of using a tire curing press to make a tire, comprising:
    installing a tire curing bladder into the tire curing press, wherein the tire curing bladder comprises a vulcanized elastomeric composition comprising 100 parts by weight of elastomer, a curative, and from 1 phr to 50 phr of a hydrocarbon polymer modifier, wherein the elastomer comprises at least one isobutylene based elastomer, wherein the hydrocarbon polymer modifier comprises monomers selected from the group consisting of piperylenes, cyclic pentadienes, aromatics, limonenes, pinenes, amylenes, and combinations thereof, and wherein the cyclic pentadienes comprise at least 10 weight percent of the monomers by total weight of the monomers, wherein the hydrocarbon polymer modifier has a number average molecular weight in the amount of about 350 g/mole to about 450 g/mole and a Ring and Ball Softening Point in the amount of about 120° C. to about 125° C.;
    loading an uncured hydrocarbon rubber composition into a mold of the tire curing press between the curing bladder and a mold surface;
    closing the mold and expanding the curing bladder therein to press the uncured hydrocarbon rubber composition against the mold surface;
    curing the hydrocarbon rubber composition under conditions of heat and pressure;
    deflating the curing bladder; and
    removing the cured hydrocarbon rubber composition from the mold.

18. The method of claim 17, wherein the vulcanized elastomeric composition of tire curing bladder comprises an average aged (3 days at 100° C., 7 days at 100° C. and 3 days at 125° C.) tensile strength retention less than about 130 percent, an average aged (3 days at 100° C., 7 days at 100° C. and 3 days at 125° C.) tear strength retention less than about 110 percent, an air permeation coefficient less than about 150 cc*mm/(m²·day), a fatigue life of at least 700 kilocycles, and a DeMattia cut growth less than about 10 mm.

19. In a process using a tire curing press to make a tire, comprising installing a tire curing bladder into the tire curing press and repetitively loading an uncured hydrocarbon rubber composition into a mold of the tire curing press between the curing bladder and a mold surface, closing the mold and expanding the curing bladder therein to press the uncured hydrocarbon rubber composition against the mold surface, curing the hydrocarbon rubber composition for a period of time under conditions of heat and pressure, deflating the curing bladder and removing the cured hydrocarbon rubber composition from the mold, a method to extend a pull point of the curing bladder, to reduce the curing time for the hydrocarbon rubber composition, or both, comprising:

installing a tire curing bladder into the press, wherein the tire curing bladder comprises a vulcanized elastomeric composition comprising 100 parts by weight of elastomer, a curative and from 1 to 50 phr of a hydrocarbon polymer modifier, wherein the elastomer comprises at least one isobutylene based elastomer, wherein the hydrocarbon polymer modifier comprises monomers selected from the group consisting of piperylenes, cyclic pentadienes, aromatics, limonenes, pinenes, amylenes, and combinations thereof, and wherein the cyclic pentadienes comprise at least 10 weight percent of the monomers by total weight of the monomers, wherein the hydrocarbon polymer modifier has a number average molecular weight in the amount of about 350 g/mole to about 450 g/mole and a Ring and Ball Softening Point in the amount of about 120° C. to about 125° C.

20. The method of claim 19, wherein the vulcanized elastomeric composition comprises an average aged (3 days at 100° C., 7 days at 100° C. and 3 days at 125° C.) tensile strength retention less than about 130 percent, an average aged (3 days at 100° C., 7 days at 100° C. and 3 days at 125° C.) tear strength retention less than about 110 percent, an air permeation coefficient less than about 150 cc*mm/(m²·day), a fatigue life of at least 700 kilocycles, and a DeMattia cut growth less than about 10 mm.

* * * * *